(12) United States Patent
Bodas et al.

(10) Patent No.: US 10,455,259 B2
(45) Date of Patent: Oct. 22, 2019

(54) ENHANCED TEXT RENDERING AND READABILITY IN IMAGES

(71) Applicant: Intel Corporation, Santa Clara, CA (US)

(72) Inventors: Anand V. Bodas, Bangalore (IN); Vishalakshi Raghurama, Shimoga (IN)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 15/684,743

(22) Filed: Aug. 23, 2017

(65) Prior Publication Data

US 2019/0069007 A1 Feb. 28, 2019

(51) Int. Cl.
*H04N 19/44* (2014.01)
*H04N 19/70* (2014.01)
(Continued)

(52) U.S. Cl.
CPC ..... *H04N 21/234345* (2013.01); *H04N 19/44* (2014.11); *H04N 19/70* (2014.11);
(Continued)

(58) Field of Classification Search
None
See application file for complete search history.

(56) References Cited

U.S. PATENT DOCUMENTS

| 8,648,858 B1 * | 2/2014 | Swenson | G06T 9/00 |
| | | | 345/428 |
| 2002/0037100 A1 * | 3/2002 | Toda | G06T 9/00 |
| | | | 382/166 |

(Continued)

OTHER PUBLICATIONS

Wang, Z., et.al.: "Real-World Font Recognition Using Deep Network and Domain Adaptation", arXiv:1504.00028v1 [cs.CV], https://arxiv.org/pdf/1504.00028.pdf, Mar. 31, 2015, 2 pages, Cornell University, Ithaca, NY, USA.

(Continued)

*Primary Examiner* — Yanna Wu
(74) *Attorney, Agent, or Firm* — Grossman, Tucker, Perreault & Pfleger, PLLC

(57) ABSTRACT

One embodiment provides a text metadata encoding logic. The text metadata encoding logic includes a metadata generation logic configured to generate a first text metadata including metadata for each identified text field included in a first image frame. The metadata generation logic maybe further configured to associate the first text metadata with the first image frame. The first text metadata may be transmitted at a text metadata bit rate. The text metadata bit rate may be less than an image data transmit bit rate.

Another embodiment provides a text metadata decoding logic. The text metadata decoding logic includes a metadata reader logic configured to decode a text metadata received with an image frame data. The text metadata may have been transmitted at a text metadata bit rate and the image frame data may have been transmitted at a first image transmit bit rate. The text metadata bit rate is less than the first image transmit bit rate. The text metadata may include metadata for each identified text field included in an image frame corresponding to the image frame data. The text metadata decoding logic may further include a metadata rendering logic configured to render each text field based, at least in part, on the received text metadata.

18 Claims, 5 Drawing Sheets

(51) Int. Cl.
    *H04N 21/81*    (2011.01)
    *H04N 21/2343*  (2011.01)
    *H04N 21/488*   (2011.01)
    *H04N 21/4402*  (2011.01)
    *H04N 21/431*   (2011.01)

(52) U.S. Cl.
    CPC . *H04N 21/4316* (2013.01); *H04N 21/440236* (2013.01); *H04N 21/440245* (2013.01); *H04N 21/4882* (2013.01); *H04N 21/8146* (2013.01)

(56) References Cited

U.S. PATENT DOCUMENTS

2010/0158136 A1* 6/2010 Peng .................... H04N 19/176
                                                    375/240.27

2015/0070587 A1* 3/2015 Emeott .............. H04N 21/4316
                                                    348/589

OTHER PUBLICATIONS

He, T., et.al.: "Text-Attentional Convolutional Neural Network for Scene Text Detection", IEEE Transactions on Image Processing, vol. 25, Issue: 6, Mar. 28, 2016, 13 pages, IEEE, Piscataway, NJ, USA.

Syal, N., et al.: "A Study of Text Localization Algorithms for Complex Images", International Journal of Innovative Research in Computer and Communication Engineering, Apr. 2014, pp. 3943-3947, vol. 2, Issue 4, IJIRCCE, Tamilnadu, India.

Neumann, L., et al.: "A method for text localization and recognition in real-world images", 10th Asian Conference on Computer Vision, Nov. 8-10, 2010, pp. 1-14, ACCV, Queenstown, New Zealand.

* cited by examiner

300

```
01    <FrameInfo StartTime=100 EndTime=120>
02        <VideoText id="VideoText1"
03            fontSize="40"
04            fontType="Courier New"
05            fontColor="0xffa000"
06            fontBackgroundColor="0x080808" >
07            <Position> Xpercent=40 Ypercent=75 Angle=0 </Position>
08            <Text> "Multiple selection criteria" </Text>
09        </VideoText>

10        <VideoText id="VideoText2"
11            fontSize="40"
12            fontType="Courier New"
13            fontColor="0xffa000"
14            fontBackgroundColor="0x080808" >
15            <Position> Xpercent=40 Ypercent=85 Angle=0 </Position>
16            <Text> "Some simple statistics" </Text>
17        </VideoText>
18    </FrameInfo>
```

FIG. 3

ENHANCED TEXT RENDERING AND READABILITY IN IMAGES

FIELD

The present disclosure relates to text rendering and readability, in particular to, enhanced text rendering and readability in images.

BACKGROUND

Users watching low resolution (<480p (i.e., 854×480)) video with text (for example, a tutorial, with text content in the video stream), in many cases, cannot clearly read the actual text displayed in video. Text is high frequency (i.e., relatively high bit rate) data for video encoding and is significantly degraded at lower resolution/bitrate of encoding. Today, there are no standardized solutions to enable high quality rendering of text in videos at low resolutions/bitrates.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 3 illustrates one example text metadata, consistent with one embodiment of the present disclosure;

Figure 1:
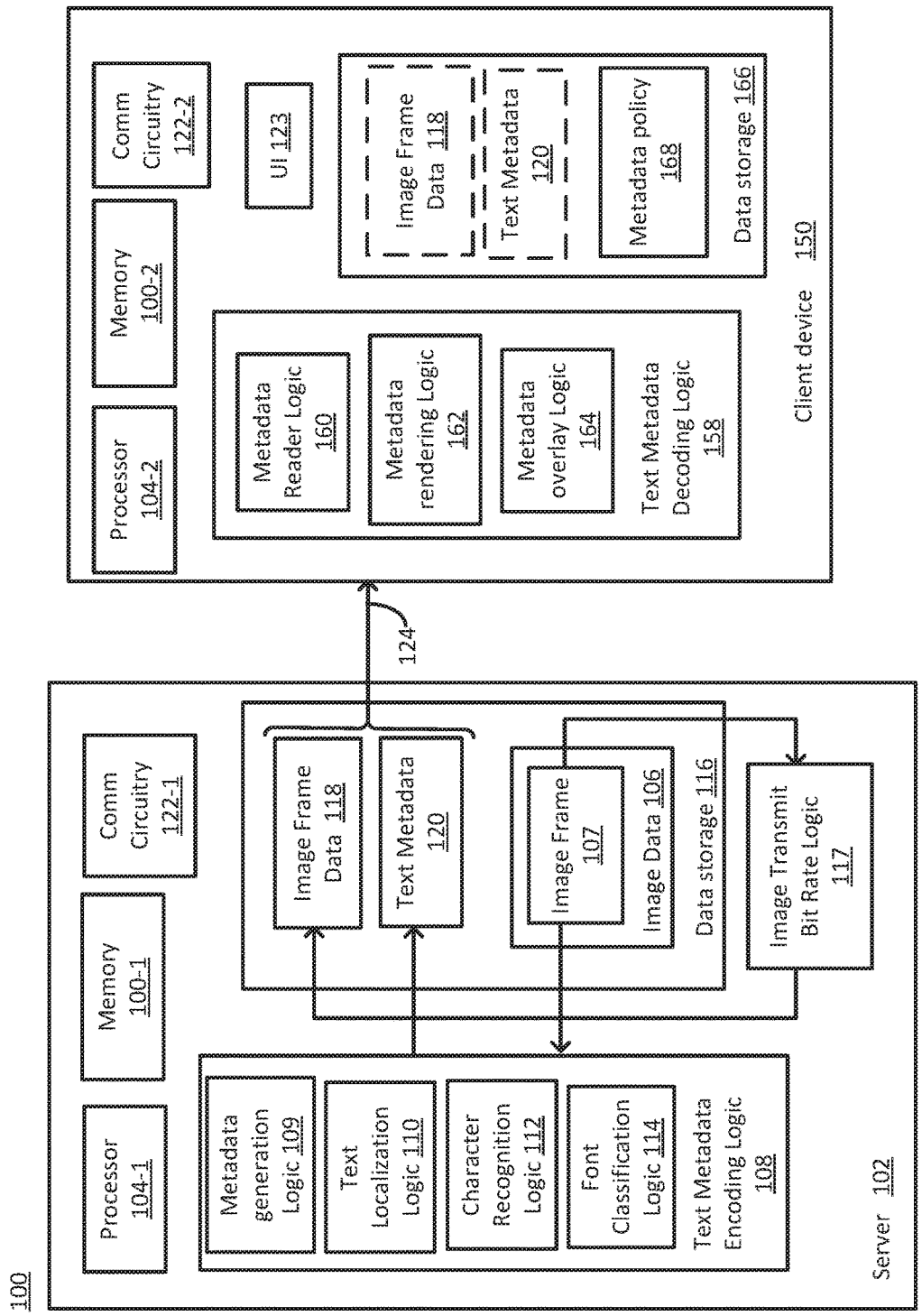
FIG. 1 illustrates a functional block diagram of an enhanced text rendering and readability system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to an enhanced text rendering and readability system. An apparatus, method and/or system are configured to read text data from an image frame at a source (for example, server) device, generate corresponding text metadata and then encode the text metadata along with image frame data. The text metadata may be generated based, at least in part, on one or more of text localization, OCR (optical character recognition) and font classification. The text metadata may then be stored and reused in a transmitted, lower resolution version of the image frame. As used herein, "image frame" corresponds to a video frame in a sequence of video frames or an individual image. As used herein, "image frame data" corresponds to video frame data or image data.

The image frame data and text metadata may then be transmitted (for example, streamed) to a client device. The text metadata may then be extracted, the corresponding text may be rendered and the rendered text may be overlaid on the received image frame. Thus, relatively low bandwidth text metadata may be utilized to produce relatively high quality text at the receiving client device.

The text metadata stream is relatively low in bandwidth consumption and thus may not adversely impact transmission size. Text rendering is typically a vector (glyphs) operation configured to produce relatively high quality output that is independent of frame resolution.

The resulting text at the client device may then be readable even for relatively low resolution image frames. In an embodiment, the text metadata generation and/or text metadata extraction and associated text rendering may be implemented in the form of an accelerator in a video/image rendering pipeline. The accelerator may include, but is not limited to, a neural network, a digital signal processor, a dedicated co-processor, etc.

One embodiment provides a text metadata encoding logic. The text metadata encoding logic includes a metadata generation logic configured to generate a first text metadata including metadata for each identified text field included in a first image frame. The metadata generation logic maybe further configured to associate the first text metadata with the first image frame. The first text metadata may be transmitted at a text metadata bit rate. The text metadata bit rate may be less than an image data transmit bit rate.

Another embodiment provides a text metadata decoding logic. The text metadata decoding logic includes a metadata reader logic configured to decode a text metadata received with an image frame data. The text metadata may have been transmitted at a text metadata bit rate and the image frame data may have been transmitted at a first image transmit bit rate. The text metadata bit rate is less than the first image transmit bit rate. The text metadata may include metadata for each identified text field included in an image frame corresponding to the image frame data. The text metadata decoding logic may further include a metadata rendering logic configured to render each text field based, at least in part, on the received text metadata.

Text, along with its properties, may be extracted from an image frame using a plurality of known techniques. The known techniques include text localization, character recognition and font classification. Text localization is configured to identify and bound each text field in an image frame. Each text field may contain one or more characters and/or one or more words. Character recognition may include Optical Character Recognition (OCR) and it configured to "read" text, in other words, to identify each character contained in a text field. Font classification is configured to identify the associated font (i.e., font typeface) of the identified characters in the text field.

The text may be extracted from relatively high resolution image frames and corresponding text metadata may be generated. The text metadata may then be encoded along with the image frame and transmitted to the client device. Image frame data may be generated for each image frame based, at least in part, on an image transmit bit rate. The image frame data may thus have a corresponding image resolution that is related to the image transmit bit rate. The text metadata is configured to be transmitted at a text metadata bit rate. The text metadata may be associated with an image frame and corresponding image frame data may be transmitted at one or more image transmit bit rates. Thus, the text metadata may be associated with the image frame and may be used for any of a plurality of transmitted image frame data resolutions (and image transmit bit rates).

The text metadata may then be extracted at the client device and utilized to produce high fidelity output during rendering even at relatively low image frame data resolutions and image transmit bitrates. In other words, the text metadata bit rate is independent of the image transmit bit rate. The text metadata bit rate is less than the image transmit bit rates and may be utilized at the client device to produce relatively high resolution text. The apparatus, method and/or system may be utilized in any case where there is text in an image frame. The apparatus, method and/or system may be utilized, in particular, in bandwidth constrained scenarios.

Thus, text metadata may be generated based, at least in part, on a relatively high resolution image. The text metadata may then be transmitted at a relatively low bit rate (e.g., 50 kilobits per second (Kbps) in a relatively low resolution format, while still maintaining the text fidelity. The text metadata may be generated once and then used for a plurality of relatively low resolution image frame data and relatively low bit rates. As used herein, relatively high resolution is a greater resolution than relatively low resolution.

In an embodiment, a user may be provided an option of enabling or disabling such an overlay over the decoded image frame.

Thus, relatively high quality text may be rendered and overlaid on an image frame at a client device. The relatively high quality text may be rendered based, at least in part, on relatively low bandwidth text metadata compared to, for example, an image data transmit bit rate.

FIG. 1 illustrates a functional block diagram of an enhanced text rendering and readability system 100 consistent with several embodiments of the present disclosure. System 100 may include a server 102 and at least one client device, e.g., client device 150. The server 102 may be coupled to client device 150 by communication channel 124. Communication channel 124 may have an associated bandwidth, as described herein.

Server 102 may include, but is not limited to, a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc. Client device 150 may include, but is not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc.

Server 102 and client device 150 may each include a respective processor 104-1, 104-2, a respective memory 100-1, 100-2 and a respective communication circuitry 122-1, 122-2. For example, each processor 104-1, 104-2 may correspond to a single core or a multi-core general purpose processor, such as those provided by Intel® Corp., etc. Server 102 may further include text metadata encoding logic 108, data storage 116 and image transmit bit rate logic 117. For example, data storage 116 may be included in memory 100-1. In another example, data storage 116 may be included in a storage device, e.g., a hard disk drive, a solid state drive, a removable storage device, etc. Data storage 116 is configured to store image data 106, image frame data 118 and text metadata 120, as described herein. Image data 106 may include one or more image frames, e.g., image frame 107. For example, the image frames may be uploaded to server 102 and stored in image data 106.

Operation of system 100 may include three parts: e.g., creation of text metadata at a source device, e.g., server 102, transmission of image frame data and associated text metadata and rendering of text onto a received image frame at a client device 150. Creation may include parsing a plurality of image frames to create corresponding text metadata. The image frames, e.g., image frame 107, may be stored in image data 106. Generally, image frames may be recorded at relatively high resolution and text included in such image frames is generally clearly readable at a source device. Analyzing such high resolution image frames may facilitate localizing one or more text fields with relatively high confidence. Text field data may then be extracted using, for example, optical character recognition (OCR) and corresponding font information may be extracted using, for example, a font classifier. The text information may then be associated with the corresponding image frame as text metadata. Generating the text metadata may include decoding the image frames and analyzing each image frame to determine whether text is present. In the following, extracting text information for a single image frame is described. The described operations may be performed for one or more image frames, e.g., a video that includes a plurality of video frames or a sequence of images.

Text metadata encoding logic 108 includes metadata generation logic 109, text localization logic 110, character recognition logic 112 and font classification logic 114. Metadata generation logic 109 may be configured to generate text metadata based, at least in part, on an image frame, e.g., image frame 107, as will be described in more detail below.

Figure 2:
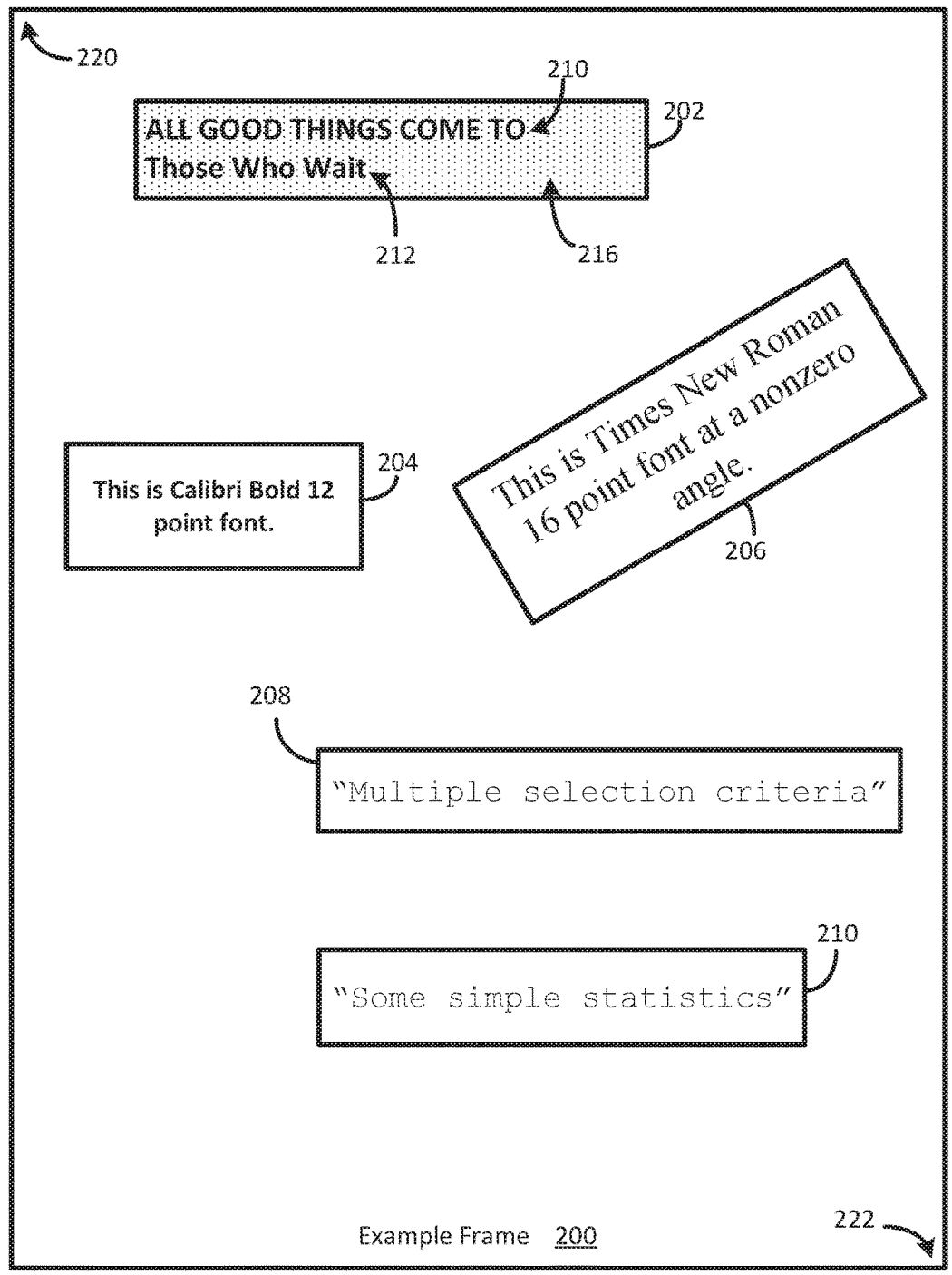
FIG. 2 is one illustrative example image frame containing a plurality of text fields.

FIG. 2 is one illustrative example image frame 200 containing a plurality of text fields 202, 204, 206, 208 and 210. Example image frame 200 may correspond to a video frame in a sequence of video frames and/or an image, i.e., an individual image frame. Example image frame 200 is one example of image frame 107 of FIG. 1. Each text field 202, 204, 206, 208 and 210 contains text. Respective positions of the plurality of text fields are distributed throughout example image frame 200 and an orientation of one or more text fields, e.g., text field 206, relative to the frame may vary. For a two-dimensional image frame, e.g., example image frame 200, an upper left corner 220 may correspond to a zero, zero (e.g., origin in an x, y coordinate system) frame position and a lower right corner 222 may correspond to a maximum, maximum (e.g., 100%, 100%) frame position. The definition of the coordinate system and the relative values are provided for ease of description and the instant disclosure is not limited in this regard.

The following description may be best understood when considering FIG. 1 in combination with FIG. 2. Example image frame 200 is one example of an image frame that may be included in image data 106. Text metadata encoding logic 108 may be configured to retrieve an image frame, e.g., example image frame 200, from image data 106. Text metadata encoding logic 108 may be configured to generate a unique identifier corresponding to the image frame. In one nonlimiting example, the identifier may include a start time parameter and an end time parameter corresponding to a time sequence of the image frame in a sequence of image frames. Text localization logic 110 may be configured to determine, i.e., identify, each text field included in the retrieved image frame. For example, considering example image frame 200, text localization logic 110 may identify text fields 202, 204, 206, 208 and 210.

Text localization logic 110 may correspond to one or more known text localization techniques. Text localization techniques are configured to identify regions of text in an image frame. Text localization techniques may be further configured to determine a respective location of each region of text, i.e., text field, in the image frame. Text localization techniques may include, but are not limited to, a convolutional neural network, a text attentional convolutional neural network, a connected component-based method (e.g., extremal regions, maximally stable extremal regions, stroke width transform, stroke feature transform, color-enhanced contrasting extremal region followed by a neural network classifier, a random forest, text covariance descriptors, etc.), a sliding window-based technique followed by a random ferns classifier with a histogram of oriented gradients and/or a boosted cascade amplifier, texture-based techniques (e.g., Fourier transforms, discrete cosine transform, wavelet decomposition, etc.), region-based approach (e.g., edge based, connected component-based, etc.) etc.

Each text field, e.g., first text field 202, may include text 210, 212 that may be overlaid on a background 216. Each text field may be positioned at an angle relative to a reference angle, e.g., a horizontal. For example, an angle of the first text field 202 may be equal to zero. In another example, an angle of a second text field 206 may be nonzero.

The text field may be described by one or more text field parameters. Text field parameters may include, but are not limited to, one or more position parameters for each determined (i.e., identified) text field, a count of text fields included in the image frame and/or a content of the text itself for each identified text field. The text included in each text field may be described by one or more font parameters. Font parameters may include, but are not limited to, font size, font type, font color, font background color, font type qualifier, text fill type, etc. Font type qualifiers may include, but are not limited to, bold, underline, superscript, subscript, italics, etc. Text fill type may include, but is not limited to, with gradient, without gradient, etc. The position parameters correspond to the position of each text field in the image frame.

Text field position parameters may include, but are not limited to, and x-coordinate, a y-coordinate and/or an orientation, e.g., an angle, for each identified text field. In some embodiments, the x-coordinate and the y-coordinate may be determined relative to an origin, e.g., an upper left corner of the image frame. In some embodiments, the x-coordinate and the y-coordinate may be determined as a respective percentage configured to provide a relative position between the origin and an opposite diagonal corner of the image frame. Thus, for example, in example frame 200, position 220 corresponds to the origin and position 222 corresponds to the opposite diagonal corner of the image frame 200.

After each text field has been identified, character recognition logic 112 may be configured to determine, e.g., identify, each text character and/or each word included in each text field 202, 204, 206, 208, 210. Character recognition logic 112 may be further configured to determine a respective count of a number of words included in each text field. Character recognition logic 112 may correspond to one or more known optical character recognition techniques. Optical character recognition techniques may be configured to identify each character included in a defined text field. Optical character recognition techniques may include, but are not limited to, matrix matching, pattern matching, pattern recognition, image correlation, feature extraction, nearest neighbor classifiers, e.g., a K nearest neighbor technique, a Cuneiform technique, a Tesseract technique, etc. Thus, character recognition logic 112 may be configured to determine the content of the text itself.

Font classification logic 114 may then be configured to determine one or more font parameters for each word in a selected text field. Font classification logic 114 may correspond to one or more known font classification techniques. Font classification techniques may be configured to determine one or more of font size, font type, font type parameter (e.g., bold, italics, underline, etc.), font color of an identified word and/or font background color. Font classification techniques may include, but are not limited to, convolutional neural networks, a stacked convolutional auto encoder, image net classification with the deep convolutional neural network, deep learning convolutional network, etc. Thus, font classification logic 114 may be configured to determine one or more font parameters for each word in the selected text field.

Text metadata encoding logic 108, e.g., metadata generation logic 109, may be configured to associate each identified text field with the corresponding image frame identifier and to store each text field identifier associated with its corresponding image frame identifier in text metadata 120. Text metadata encoding logic 108, e.g., metadata generation logic 109, may further be configured to store the position parameters, the text content and font parameters, associated with each corresponding text field identifier, in text metadata 120. Thus, the text metadata 120 may include one or more image frame identifiers. Each image frame identifier may be associated with one or more text field identifiers. Each text field identifier may be associated with one or more text field parameters and/or one or more font parameters, as described herein.

In an embodiment, the text field position parameters may be determined relative to the frame size. In other words, an absolute pixel position or size of a text field may not be stored, rather the relative position of the text field with respect to the frame size may be stored. Utilizing relative values is configured to facilitate reuse of the text metadata independent of the frame size. Thus, if the transmitted image frames are of lower resolution and lower bitrate, a client device may decode the relative position and size of the text for the target frame size at the client device.

FIG. 3 illustrates one example text metadata 300, consistent with one embodiment of the present disclosure. In other examples, text metadata may include more or fewer font parameters and/or more or fewer text field parameters. Text metadata may include a metadata frame and a metadata frame identifier. Example text metadata 300 is related to a video frame but the present disclosure is not limited in this regard. The following description may be best understood when considering FIG. 3 in combination with FIG. 2. A first column in example text metadata 300 includes line numbers. The line numbers are included for ease of description and have no meaning otherwise.

Example text metadata 300, line 01 includes a metadata frame identifier that, in this example, corresponds to a start time and an end time for the corresponding metadata. A single metadata frame may correspond to one or more image frames. For example, text metadata 300 may be applicable to any image frame that falls between the start time and the end time of the corresponding metadata frame. In other words, in this example, each image frame that falls between the start time and the end time of the corresponding metadata frame contains text fields 208 and 210 of FIG. 2. Line 18 is configured to indicate an end of the corresponding text metadata associated with the identified metadata frame. Example text metadata 300 includes text metadata for two identified text fields. The included text metadata corresponds to text fields 208 and 210 of FIG. 2. Text field 208 corresponds to line 02 through line 09 of example text metadata 300. Text field 210 corresponds to line 10 through line 17 of example text metadata 300. Lines 02 and 10 include a respective text field identifier. Lines 03 through 06 and lines 11 through 14 include font parameter values for each respective text field. Lines 07 and 15 include text field position parameter values for each respective text field. Lines 08 and 16 include respective content for each respective text field 208, 210. Metadata may include alternative and/or additional fields to include, for example, relatively more complete information about the text fragments being described in this metadata. In other words, example text metadata 300 is one nonlimiting example.

Turning to FIG. 1, the text metadata, e.g., text metadata 120, may be generated by metadata generation logic 109 based, at least in part, on an associated image frame, e.g., image frame 107, included in image data 106. The text metadata 120 may then be associated with image frame 107 and stored in data storage 116.

Prior to transmission, image transmit bit rate logic 117 is configured to identify an image transmit bit rate for an image frame, e.g., image frame 107. The image transmit bit rate may be independent of a resolution of image frame 107. The image transmit bit rate may be determined based, at least in part, on an available bandwidth of communication channel 124 and/or based, at least in part, on transmission bit rate determined by a user of client device 150. For example, a user may select a relatively lower transmission bit rate to reduce data usage and possible charges associated with data usage and channel 124.

Image frame data, e.g., image frame data 118, may then be generated based, at least in part, on the image transmit bit rate for the image frame 107. The image frame data 118 may then have an associated decoded image frame resolution at client device 150, as described herein. Image resolution of streaming video (that includes a plurality of sequential image frames), such as transmitted by, for example, YouTube® and/or Facebook®, is related to the corresponding image transmit bit rate. Table 1 illustrates one example of a plurality of image resolutions and corresponding image transmit bit rates for YouTube®.

TABLE 1

| Name | Image Resolution | Image transmit bit rate (Kbps) |
|---|---|---|
| 240p | 426 × 240 | 300-700 |
| 360p | 640 × 360 | 400-1000 |
| 480p | 854 × 480 | 500-2000 |
| 720p | 1280 × 720 | 1500-4000 |
| 1080p | 1920 × 1080 | 3000-6000 |
| 1440p | 2560 × 1440 | 6000-13000 |
| 2160p | 3840 × 2160 | 13000-34000 |

Thus, image frame data 118 may have a corresponding image resolution that is related to a selected image transmit bit rate. The text metadata, generated based, at least in part, on image frame 107, is independent of the corresponding transmitted image resolution. In other words, the text metadata associated with image frame 107 may be utilized with corresponding image frame data 118 that has any image resolution and is transmitted any image transmit bit rate. A same text metadata may be associated with a relatively low resolution relatively low image transmit bit rate configured to reduce transmission bandwidth or a relatively high resolution relatively high image transmit bit rate configured to yield a relatively high resolution image frame at the client device. The rendered text for an image frame at the client device, as described herein, may be relatively high quality, independent of the image transmit bit rate of the corresponding image frame data.

The image frame data 118 may then be transmitted to the client device 150 via communication channel 124. For example, communication circuitry 122-1 may be configured to transmit the image frame data 118. The text metadata 120 is configured to be transmitted to client device 150 along with the image frame data 118. The text metadata may be transmitted at a text metadata bit rate. The text metadata bit rate is configured to be less than the image transmit bit rate. In one nonlimiting example, the text metadata bit rate is 50 Kbps. Communication circuitry 122-1 may be configured to transmit the text metadata 120. For example, the text metadata 120 may be transmitted with the image frame data 118. In one nonlimiting example, the transmission may comply and/or be compatible with MPEG-7.

In some situations, one or more text fields may be constant, i.e., may be the same, for a plurality of sequential image frames. In these situations, metadata generation logic 109 may be configured to include an indicator in the text metadata associated with the text field and that is related to a number of sequential image frames in which the text field is the same. In one example, the indicator may correspond to a count of sequential image frames that contain the same text field. In another example, the indicator (e.g., line 01, of FIG. 3) may include a start time and a stop time of a time interval that includes the plurality of sequential image frames that each includes at least one same text field. Text metadata may then not be transmitted with the subsequent image frames and the corresponding client device may be configured to utilize the text metadata provided with the first image frame of the sequence. Thus, text metadata creation and storage may be optimized across frames if the text field information hasn't changed.

Client device 150 includes user interface (UI) 123. UI 123 includes one or more user input devices (e.g., a mouse, a touchpad, a touch sensitive display, a keypad, a keyboard, etc.) and/or output devices (e.g., a display, a touch sensitive display, a monitor, a screen, etc.). Client device 150 may further include text metadata decoding logic 158 and data storage 166. Text metadata decoding logic 158 may include a metadata reader logic 160, a metadata rendering logic 162 and a metadata overlay logic 164. Data storage 166 may be configured to store image frame data 118 and/or text metadata 120 received from server 102, as described herein.

Client device 150, e.g., comm. circuitry 122-2, may be configured to receive transmitted image frame data and corresponding text metadata. Text metadata decoding logic 158 may then be configured to decode the text metadata, render the corresponding text and overlay the rendered text onto the image frame corresponding to the image frame data 118, for display to a user.

Metadata reader logic 160 may be configured to decode the image frame data and associated text metadata. The decoded image frame data may then be utilized to generate an associated image frame. The associated image frame may have an image frame resolution that is related to the image transmit bit rate, as described herein. Metadata reader logic 160 may be further configured to determine whether or not text overlay is enabled. For example, whether or not text overlay is enabled may be determined based, at least in part, on metadata policy 168. For example, metadata policy 168 may include an indicator configured to indicate whether or not the text overlay is enabled. If text overlay is enabled, metadata reader logic 160 may be configured to read the associated text metadata, e.g., text metadata 120, for the received image frame data.

The text metadata 120 may include a count of corresponding text fields, as described herein. For each text field, metadata rendering logic 162 may be configured to render the text field based, at least in part, on one or more of the text field parameters and/or font parameters, as described herein. Metadata overlay logic 164 may then be configured to overlay each rendered text field onto a corresponding decoded image frame at a specified position. Metadata rendering logic 162 and/or metadata overlay logic 164 may be configured to scale the rendered text fields according to a display image frame size. The operations of metadata reader logic 160, metadata rendering logic 162 and metadata overlay logic 164 may be repeated for each text field described in text metadata 120.

In some situations, one or more text fields may be constant, i.e., may be the same, for a plurality of sequential image frames. Metadata reader logic 160 may be configured to decode the indicator in the text metadata corresponding to the count of frames in which a text field is constant, as described herein. Text metadata decoding logic 158 may then be configured to utilize the text metadata provided with the first image frame of the sequence for the subsequent image frames. Thus, text metadata transmission and rendering may be optimized across frames if the text field information hasn't changed.

Thus, relatively low bandwidth text metadata may be utilized to render relatively high resolution text on a corresponding image frame received at a client device, e.g., client device 150. The resolution of the rendered text may be independent of the resolution of the corresponding image frame.

Figure 4A:
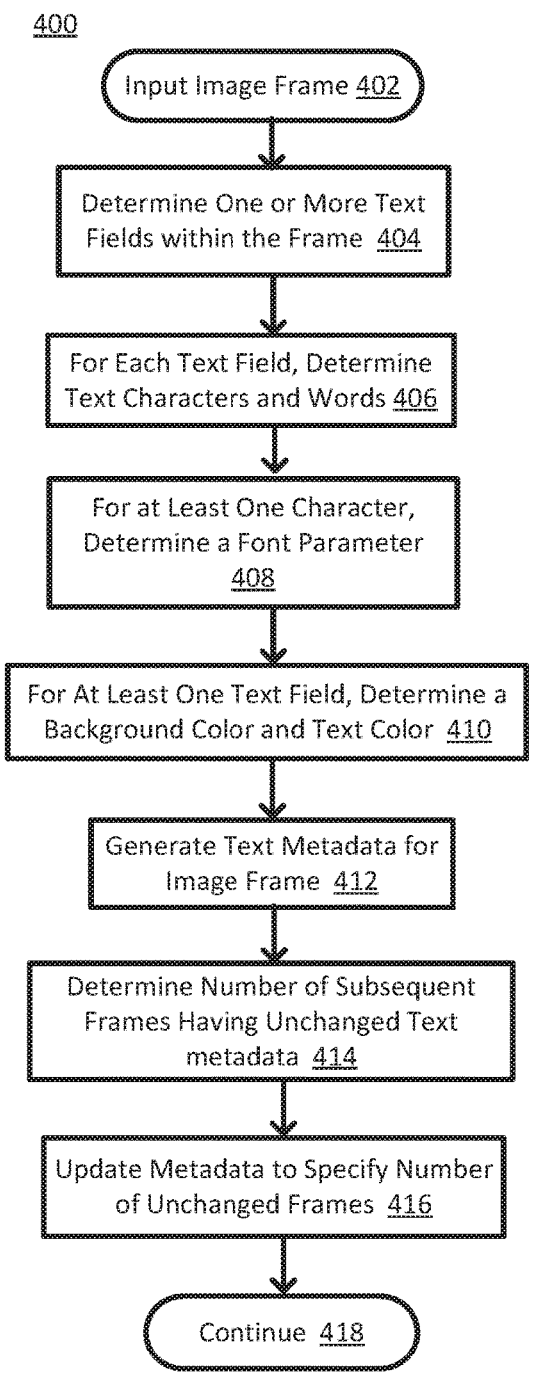
FIGS. 4A and 4B are flowcharts of server operations according to various embodiments of the present disclosure.

FIG. 4A is a flowchart 400 of server operations according to various embodiments of the present disclosure. In particular, the flowchart 400 illustrates generating text metadata based, at least in part, on an image frame. The operations may be performed, for example, by text metadata encoding logic 108, metadata generation logic 109, text localization logic 110, character recognition logic 112 and/or font classification logic 114 of server 102, of FIG. 1.

Operations of this embodiment may begin with an input image frame 402. Input image frame 402 may correspond to a video frame or an image. Operation 404 may include determining one or more text fields within the input image frame. Operation 406 may include determining, for each text field, one or more text characters and/or words. Operation 408 may include determining, for at least one character, a font parameter. Operation 410 may include determining, for at least one text field, a background color and a text color. Operation 412 may include generating text metadata for the input image frame. In some embodiments, operation 414 may include determining a subsequent number of frames having unchanged text metadata. Operation 416 may include updating the text metadata with a count of the number of frames with unchanged text metadata. Program flow may then continue in operation 418. Operations 404 through operation 418 may be repeated for each unique input image frame in a sequence of image frames.

Thus, text metadata may be generated based, at least in part, on an image frame.

Figure 4B:
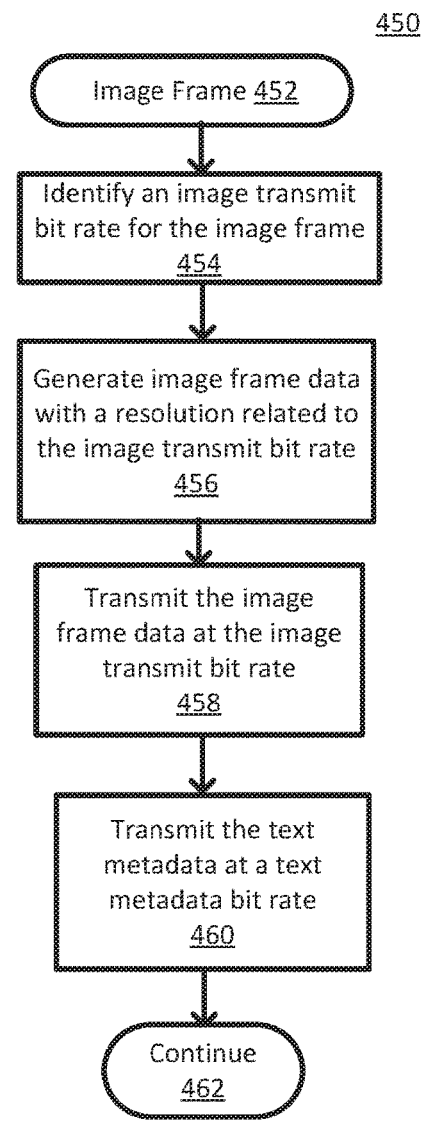

FIG. 4B is a flowchart 450 of server operations according to various embodiments of the present disclosure. In particular, the flowchart 450 illustrates generating image frame data based, at least in part, on an image frame. The operations may be performed, for example, by image transmit bit rate logic 117 and/or communication circuitry 122-1 of server 102, of FIG. 1.

Operations of this embodiment may begin with an image frame 452. The image frame 452 may correspond to a video frame or an image. Operation 454 includes identifying an image transmit bit rate for the image frame. In one example, the image transmit bit rate may be determined based, at least in part, on an available bandwidth of a communication channel. In another example, the image transmit bit rate may be determined based, at least in part, on a user selection. An image frame data with a resolution related to the image transmit bit rate may be generated at operation 456. The image frame data may be transmitted at the image transmit bit rate at operation 458. For example, the image frame data may be transmitted to a client device. The text metadata may be transmitted at a text metadata bit rate at operation 460. The metadata bit rate may be less than the image transmit bit rate. Program flow may then continue at operation 462.

Thus, image frame data may be generated based, at least in part, on an image transmit bit rate.

Figure 5:
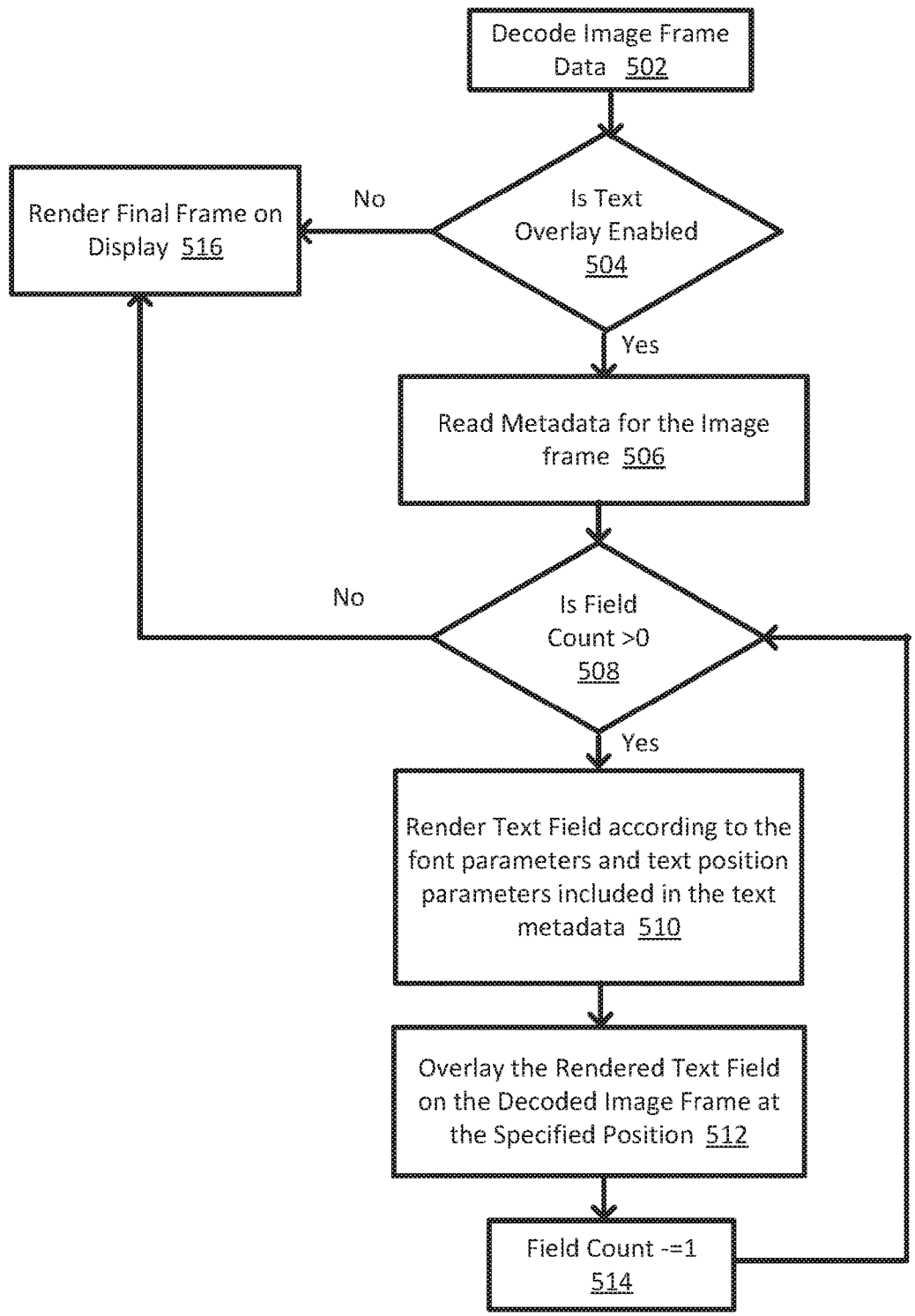
FIG. 5 is a flowchart of client device operations according to various embodiments of the present disclosure.

FIG. 5 is a flowchart 500 of client device operations according to various embodiments of the present disclosure. In particular, the flowchart 500 illustrates decoding received text metadata and rendering and overlaying the corresponding text onto the associated received image frame. The operations may be performed, for example, by text metadata decoding logic 158, metadata reader logic 160, metadata rendering logic 162 and/or metadata overlay logic 164 of client device 150, of FIG. 1.

Operations of this embodiment may begin with a decoded image frame data 502. Decoded image frame data 502 may correspond to a video frame or an image. Whether text overlay is enabled may be determined in operation 504. If text overlay is not enabled, the final frame (e.g., the decoded image frame) may be rendered on a display at operation 516. If text overlay is enabled, text metadata for the image frame may be read at operation 506. Whether the text field count is greater than zero may be determined at operation 508. If the text field count is not greater than zero, program flow may then proceed to operation 516 and the final frame may be rendered on the display at operation 516. If the text field count is greater than zero, then the text field may be rendered according to the font parameters and text position parameters included in the received text metadata at operation 510. The rendered text field may be overlaid on the decoded image frame at the specified text position at operation 512. The text field count may be decremented by one in operation 514. Program flow may then proceed to operation 508.

Thus, received text metadata may be decoded and the corresponding text fields may be rendered and overlaid on the associated received image frame, if text overlay is enabled.

While the flowcharts of FIGS. 4A, 4B and 5 illustrate operations according various embodiments, it is to be understood that not all of the operations depicted in FIGS. 4A, 4B and 5 are necessary for other embodiments. In addition, it is fully contemplated herein that in other embodiments of the present disclosure, the operations depicted in FIGS. 4A, 4B and/or 5 and/or other operations described herein may be combined in a manner not specifically shown in any of the drawings, and such embodiments may include less or more operations than are illustrated in FIGS. 4A, 4B and 5. Thus, claims directed to features and/or operations that are not exactly shown in one drawing are deemed within the scope and content of the present disclosure.

Thus, an apparatus, method and/or system are configured to read text data from video frames and/or images at a source (for example, server) device, generate image frame data and corresponding metadata and then encode the text metadata along with image frame data. The image frame data and text metadata may then be transmitted (for example, streamed) to a client device. For example, the image frame data may be generated based, at least in part, on an image transmit bit rate for a corresponding image frame. The image frame data may then be transmitted at the image transmit bit rate and the text metadata may be transmitted at a text metadata bit rate. The text metadata may then be extracted, the corresponding text may be rendered and the rendered text may be overlaid on the received image frame. Thus, relatively low bandwidth text metadata may be utilized to produce relatively high quality text at the receiving client device, independent of the image transmit bit rate of the image frame data.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., client device 150 and/or server 102. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Memory 100-1, 100-2 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

EXAMPLES

Examples of the present disclosure include subject material such as a method, means for performing acts of the method, a device, or of an apparatus or system related to enhanced text rendering and readability in images, as discussed below.

Example 1

According to this example, there is provided an apparatus. The apparatus includes a text metadata encoding logic that includes a metadata generation logic. The metadata generation logic is to generate a first text metadata including metadata for each identified text field included in a first image frame and to associate the first text metadata with the first image frame. The first text metadata is to be transmitted at a text metadata bit rate. The text metadata bit rate is less than an image data transmit bit rate.

Example 2

This example includes the elements of example 1, wherein the text metadata includes at least one font parameter and at least one text field parameter for each identified text field, the at least one font parameter selected from the group including font size, font type, font color, font background color, font type qualifier and text fill type, and the at least one text field parameter selected from the group including one or more position parameters for each identified text field, a content of the text itself for each identified text field and a count of a number of text fields included in the image frame.

Example 3

This example includes the elements of example 1 or 2, wherein the metadata generation logic is to increment a count included in the first text metadata and to associate the first text metadata with a second image frame, if at least one identified text field included in the first image frame is included in the second image frame; or the metadata generation logic is to generate a second text metadata including metadata for each identified text field included in the second image frame and to associate the second text metadata with the second image frame, if no identified text field included in the first image frame is included in the second image frame.

Example 4

This example includes the elements of example 1 or 2, wherein the first text metadata includes a start time and a stop time of a time interval that includes a plurality of sequential image frames that each includes at least one same text field.

Example 5

This example includes the elements of example 1 or 2, further including an image transmit bit rate logic to identify a first image transmit bit rate for the first image frame and to generate a first image frame data that has an image resolution related to the first image transmit bit rate.

Example 6

According to this example, there is provided an apparatus. The apparatus includes a text metadata decoding logic that includes a metadata reader logic and a metadata rendering logic. The metadata reader logic is to decode a text metadata received with an image frame data. The text metadata is transmitted at a text metadata bit rate. The image frame data is transmitted at a first image transmit bit rate. The text metadata bit rate is less than the first image transmit bit rate. The text metadata includes metadata for each identified text field included in an image frame corresponding to the image frame data. The metadata rendering logic is to render each text field based, at least in part, on the received text metadata.

Example 7

This example includes the elements of example 6, wherein the text metadata decoding logic further includes a metadata overlay logic to overlay the rendered text field onto the image frame.

Example 8

This example includes the elements of example 6 or 7, wherein the text metadata includes at least one font parameter and at least one text field parameter for each identified text field, the at least one font parameter selected from the group including font size, font type, font color, font background color, font type qualifier and text fill type, and the at least one text field parameter selected from the group including one or more position parameters for each identified text field, a content of the text itself for each identified text field and a count of a number of text fields included in the image frame.

Example 9

This example includes the elements of example 6 or 7, wherein the text metadata includes a count corresponding to a number of sequential image frames, the text metadata including metadata associated with at least one text field that is included in each sequential image frame of the number of sequential image frames.

Example 10

This example includes the elements of example 6 or 7, wherein the text metadata includes a start time and a stop time of a time interval that includes a plurality of sequential image frames that each includes at least one same text field.

Example 11

According to this example, there is provided a method. The method includes generating, by a metadata generation logic, a first text metadata including metadata for each identified text field included in a first image frame; and associating, by the metadata generation logic, the first text metadata with the first image frame. The first text metadata is to be transmitted at a text metadata bit rate. The text metadata bit rate is less than an image data transmit bit rate.

Example 12

This example includes the elements of example 11, wherein the text metadata includes at least one font parameter and at least one text field parameter for each identified text field, the at least one font parameter selected from the group including font size, font type, font color, font background color, font type qualifier and text fill type, and the at least one text field parameter selected from the group including one or more position parameters for each identified text field, a content of the text itself for each identified text field and a count of a number of text fields included in the image frame.

Example 13

This example includes the elements of example 11, further including incrementing, by the metadata generation logic, a count included in the first text metadata and associating, by the metadata generation logic, the first text metadata with a second image frame, if at least one identified text field included in the first image frame is included in the second image frame; or generating, by the metadata generation logic, a second text metadata including metadata for each identified text field included in the second image frame and associating, by the metadata generation logic, the second text metadata with the second image frame, if no identified text field included in the first image frame is included in the second image frame.

Example 14

This example includes the elements of example 11, wherein the first text metadata includes a start time and a stop time of a time interval that includes a plurality of sequential image frames that each includes at least one same text field.

Example 15

This example includes the elements of example 11, further including identifying, by an image transmit bit rate logic, a first image transmit bit rate for the first image frame, generating, by the image transmit bit rate logic, a first image frame data that has an image resolution related to the first image transmit bit rate and transmitting, by a communication circuitry, the first image frame data at the first image transmit bit rate and the first text metadata at the text metadata bit rate.

Example 16

According to this example, there is provided a method. The method includes decoding, by a metadata reader logic, a text metadata received with an image frame data. The text metadata is transmitted at a text metadata bit rate. The image frame data is transmitted at a first image transmit bit rate. The text metadata bit rate is less than the first image transmit bit rate. The text metadata includes metadata for each identified text field included in an image frame corresponding to the image frame data. The method further includes rendering, by a metadata rendering logic, each text field based, at least in part, on the received text metadata.

Example 17

This example includes the elements of example 16, further including overlaying, by a metadata overlay logic, the rendered text field onto the at least one image frame.

Example 18

This example includes the elements of example 16, wherein the text metadata includes at least one font parameter and at least one text field parameter for each identified text field, the at least one font parameter selected from the group including font size, font type, font color, font background color, font type qualifier and text fill type, and the at least one text field parameter selected from the group including one or more position parameters for each identified text field, a content of the text itself for each identified text field and a count of a number of text fields included in the image frame.

Example 19

This example includes the elements of example 16, wherein the text metadata includes a count corresponding to a number of sequential image frames, the text metadata including metadata associated with at least one text field included in each sequential image frame of the number of sequential image frames.

Example 20

This example includes the elements of example 16, wherein the text metadata includes a start time and a stop time of a time interval that includes a plurality of sequential image frames that each includes at least one same text field.

Example 21

According to this example, there is provided a server. The server includes a processor; a memory to store an image frame; a text metadata encoding logic and a communication circuitry. The text metadata encoding logic includes a metadata generation logic to generate a first text metadata including metadata for each identified text field included in a first image frame and to associate the first text metadata with the first image frame. The first text metadata is to be transmitted at a text metadata bit rate. The text metadata bit rate is less than an image data transmit bit rate. The communication circuitry is to transmit the first image frame data at the first image transmit bit rate and to transmit the first text metadata at the text metadata bit rate.

Example 22

This example includes the elements of example 21, wherein the text metadata includes at least one font parameter and at least one text field parameter for each identified text field, the at least one font parameter selected from the group including font size, font type, font color, font background color, font type qualifier and text fill type, and the at least one text field parameter selected from the group including one or more position parameters for each identified text field, a content of the text itself for each identified text field and a count of a number of text fields included in the image frame.

Example 23

This example includes the elements of example 21 or 22, wherein the metadata generation logic is to increment a count included in the first text metadata and to associate the first text metadata with a second image frame, if at least one identified text field included in the first image frame is included in the second image frame; or the metadata generation logic is to generate a second text metadata including metadata for each identified text field included in the second image frame and to associate the second text metadata with the second image frame, if no identified text field included in the first image frame is included in the second image frame.

Example 24

This example includes the elements of example 21 or 22, wherein the first text metadata includes a start time and a stop time of a time interval that includes a plurality of sequential image frames that each includes at least one same text field.

Example 25

This example includes the elements of example 21 or 22, further including an image transmit bit rate logic to identify the first image transmit bit rate for the first image frame and to generate the first image frame data that has an image resolution related to the first image transmit bit rate.

Example 26

According to this example, there is provided a client device. The client device includes a processor; a communication circuitry; and a text metadata decoding logic including a metadata reader logic and a metadata rendering logic. The communication circuitry is to receive an image frame data and a text metadata from a server. The metadata reader logic is to decode the text metadata. The text metadata is transmitted at a text metadata bit rate. The image frame data is transmitted at a first image transmit bit rate. The text metadata bit rate is less than the first image transmit bit rate. The text metadata includes metadata for each text field included in an image frame corresponding to the image frame data. The metadata rendering logic is to render each text field based, at least in part, on the received text metadata.

Example 27

This example includes the elements of example 26, wherein the text metadata decoding logic further includes a metadata overlay logic to overlay the rendered text field onto the at least one image frame.

Example 28

This example includes the elements of example 26 or 27, wherein the text metadata includes at least one font parameter and at least one text field parameter for each identified text field, the at least one font parameter selected from the group including font size, font type, font color, font background color, font type qualifier and text fill type, and the at least one text field parameter selected from the group including one or more position parameters for each identified text field, a content of the text itself for each identified text field and a count of a number of text fields included in the image frame.

Example 29

This example includes the elements of example 26 or 27, wherein the text metadata includes a count corresponding to a number of sequential image frames, the text metadata associated with each sequential image frame of the number of sequential image frames.

Example 30

This example includes the elements of example 26 or 27, wherein the text metadata includes a start time and a stop time of a time interval that includes a plurality of sequential image frames that each includes at least one same text field.

Example 31

According to this example, there is provided a computer readable storage device. The device has stored thereon instructions that when executed by one or more processors result in the following operations including: generating a first text metadata including metadata for each identified text field included in a first image frame; and associating the first text metadata with the first image frame. The first text metadata is to be transmitted at a text metadata bit rate. The text metadata bit rate is less than an image data transmit bit rate.

Example 32

This example includes the elements of example 31, wherein the text metadata includes at least one font parameter and at least one text field parameter for each identified text field, the at least one font parameter selected from the group including font size, font type, font color, font background color, font type qualifier and text fill type, and the at least one text field parameter selected from the group including one or more position parameters for each identified text field, a content of the text itself for each identified text field and a count of a number of text fields included in the image frame.

Example 33

This example includes the elements of example 31 or 32, wherein the instructions that when executed by one or more processors results in the following additional operations including incrementing a count included in the first text metadata and associating the first text metadata with a second image frame, if at least one identified text field included in the first image frame is included in the second image frame; or generating a second text metadata including metadata for each identified text field included in the second image frame and associating the second text metadata with the second image frame, if no identified text field included in the first image frame is included in the second image frame.

Example 34

This example includes the elements of example 31 or 32, wherein the first text metadata includes a start time and a stop time of a time interval that includes a plurality of sequential image frames that each includes at least one same text field.

Example 35

This example includes the elements of example 31 or 32, wherein the instructions that when executed by one or more processors results in the following additional operations including identifying a first image transmit bit rate for the first image frame, generating a first image frame data that has an image resolution related to the first image transmit bit rate and transmitting the first image frame data at the first image transmit bit rate and the first text metadata at the text metadata bit rate.

Example 36

According to this example, there is provided a computer readable storage device. The device has stored thereon instructions that when executed by one or more processors result in the following operations including decoding a text metadata received with an image frame data. The text metadata is transmitted at a text metadata bit rate. The image frame data is transmitted at a first image transmit bit rate. The text metadata bit rate is less than the first image transmit bit rate. The text metadata includes metadata for each identified text field included in an image frame corresponding to the image frame data. The operations further include rendering each text field based, at least in part, on the received text metadata.

Example 37

This example includes the elements of example 36, wherein the instructions that when executed by one or more processors results in the following additional operations including overlaying the rendered text field onto the at least one image frame.

Example 38

This example includes the elements of example 36 or 37, wherein the text metadata includes at least one font parameter and at least one text field parameter for each identified text field, the at least one font parameter selected from the group including font size, font type, font color, font background color, font type qualifier and text fill type, and the at least one text field parameter selected from the group including one or more position parameters for each identified text field, a content of the text itself for each identified text field and a count of a number of text fields included in the image frame.

Example 39

This example includes the elements of example 36 or 37, wherein the text metadata includes a count corresponding to a number of sequential image frames, the text metadata including metadata associated with at least one text field included in each sequential image frame of the number of sequential image frames.

Example 40

This example includes the elements of example 36 or 37, wherein the text metadata includes a start time and a stop time of a time interval that includes a plurality of sequential image frames that each includes at least one same text field.

Example 41

According to this example, there is provided a device. The device includes means for generating, by a metadata generation logic, a first text metadata including metadata for each identified text field included in a first image frame. The device further includes means for associating, by the metadata generation logic, the first text metadata with the first image frame. The first text metadata is to be transmitted at a text metadata bit rate. The text metadata bit rate is less than an image data transmit bit rate.

Example 42

This example includes the elements of example 41, wherein the text metadata includes at least one font parameter and at least one text field parameter for each identified text field, the at least one font parameter selected from the group including font size, font type, font color, font background color, font type qualifier and text fill type, and the at least one text field parameter selected from the group including one or more position parameters for each identified text field, a content of the text itself for each identified text field and a count of a number of text fields included in the image frame.

Example 43

This example includes the elements of example 41 or 42, further including means for incrementing, by the metadata generation logic, a count included in the first text metadata and means for associating, by the metadata generation logic, the first text metadata with a second image frame, if at least one identified text field included in the first image frame is included in the second image frame; or means for generating, by the metadata generation logic, a second text metadata including metadata for each identified text field included in the second image frame and means for associating, by the metadata generation logic, the second text metadata with the second image frame, if no identified text field included in the first image frame is included in the second image frame.

Example 44

This example includes the elements of example 41 or 42, wherein the first text metadata includes a start time and a stop time of a time interval that includes a plurality of sequential image frames that each includes at least one same text field.

Example 45

This example includes the elements of example 41 or 42, further including means for identifying, by an image transmit bit rate logic, a first image transmit bit rate for the first image frame, means for generating, by the image transmit bit rate logic, a first image frame data that has an image resolution related to the first image transmit bit rate and means for transmitting, by a communication circuitry, the first image frame data at the first image transmit bit rate and the first text metadata at the text metadata bit rate.

Example 46

According to this example, there is provided a device. The device includes means for decoding, by a metadata reader logic, a text metadata received with an image frame data. The text metadata is transmitted at a text metadata bit rate. The image frame data is transmitted at a first image transmit bit rate. The text metadata bit rate is less than the first image transmit bit rate. The text metadata includes metadata for each identified text field included in an image frame corresponding to the image frame data. The device further includes means for rendering, by a metadata rendering logic, each text field based, at least in part, on the received text metadata.

Example 47

This example includes the elements of example 46, further including means for overlaying, by a metadata overlay logic, the rendered text field onto the at least one image frame.

Example 48

This example includes the elements of example 46 or 47, wherein the text metadata includes at least one font parameter and at least one text field parameter for each identified text field, the at least one font parameter selected from the group including font size, font type, font color, font background color, font type qualifier and text fill type, and the at least one text field parameter selected from the group including one or more position parameters for each identified text field, a content of the text itself for each identified text field and a count of a number of text fields included in the image frame.

Example 49

This example includes the elements of example 46 or 47, wherein the text metadata includes a count corresponding to a number of sequential image frames, the text metadata including metadata associated with at least one text field included in each sequential image frame of the number of sequential image frames.

Example 50

This example includes the elements of example 46 or 47, wherein the text metadata includes a start time and a stop time of a time interval that includes a plurality of sequential image frames that each includes at least one same text field.

Example 51

According to this example, there is provided a system. The system includes at least one device arranged to perform the method of any one of examples 11 to 15 or 16 to 20.

Example 52

According to this example, there is provided a device. The device includes means to perform the method of any one of examples 11 to 15 or 16 to 20.

Example 53

According to this example, there is provided a computer readable storage device. The device has stored thereon instructions that when executed by one or more processors result in the following operations including: the method according to any one of examples 11 to 15 or 16 to 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
    a metadata generation circuitry to generate a first text metadata comprising metadata for each identified text field included in a first image frame;
    a metadata encoding circuitry to associate the first text metadata with the first image frame for transmission at a text metadata bit rate that is less than an image data transmit bit rate associated with the first image frame; and
    to increment a count included in the first text metadata and to associate at least a portion of the first text metadata with a second image frame, responsive to a determination that at least one identified text field included in the first image frame is included in the second image frame; and
    a communication circuitry to initiate transmission of at least the first image frame, wherein to initiate transmission of at least the first image frame includes to initiate transmission of the first text metadata at the text metadata bit rate and to initiate transmission of image data of the first image frame at the image data transmit bit rate.

2. The apparatus of claim 1, wherein the first text metadata comprises at least one font parameter and at least one text field parameter for the each identified text field, wherein the at least one font parameter is selected from a group comprising font size, font type, font color, font background color, font type qualifier and text fill type, and wherein the at least one text field parameter is selected from a group comprising one or more position parameters for the each identified text field, a content of a text itself for the each identified text field, and a count of a number of text fields included in the image frame.

3. The apparatus of claim 1, wherein the metadata generation circuitry is further to generate second text metadata comprising metadata for each identified text field included in the second image frame and to associate the second text metadata with the second image frame, responsive to a determination that no identified text field included in the first image frame is included in the second image frame.

4. The apparatus of claim 1, wherein the first text metadata comprises a start time and a stop time of a time interval that includes a plurality of sequential image frames that each includes at least one same text field.

5. The apparatus of claim 1, further comprising image transmit bit rate circuitry to identify a first image transmit bit rate for the first image frame and to generate a first image frame data that has an image resolution related to the first image transmit bit rate.

6. An apparatus comprising:
    a communication circuitry to receive text metadata transmitted at a text metadata bit rate and image frame data that is associated with the text metadata and transmitted at an image data transmit bit rate that is greater than the text metadata bit rate;
    a metadata reader circuitry to decode the received text metadata, wherein the text metadata comprises metadata for one or more identified text fields included in an image frame of the received image frame data, and further comprises a count that corresponds to a number of sequential image frames of the received image frame data that each include at least one of the one or more identified text fields; and
    a metadata rendering circuitry to render each of the one or more identified text fields based, at least in part, on the received text metadata.

7. The apparatus of claim 6, wherein the text metadata decoding circuitry further comprises metadata overlay circuitry to overlay each of the rendered text fields onto the image frame.

8. The apparatus of claim 6, wherein the text metadata comprises at least one font parameter and at least one text field parameter for each of the one or more identified text fields, wherein the at least one font parameter is selected from a group that comprises font size, font type, font color, font background color, font type qualifier, and text fill type, and wherein the at least one text field parameter is selected from a group that comprises one or more position parameters for each of the one or more identified text fields, a content of the text itself for each of the one or more identified text fields, and a count of a number of text fields included in the image frame.

9. The apparatus of claim 6, wherein the text metadata comprises a start time and a stop time of a time interval that includes a plurality of sequential image frames that each includes at least one same text field.

10. A method comprising:
    generating, by a metadata generation logic, a first text metadata comprising metadata for each identified text field included in a first image frame;

associating, by the metadata generation logic, the first text metadata with the first image frame for transmission at a text metadata bit rate that is less than an image data transmit bit rate;

responsive to a determination that at least one identified text field included in the first image frame is included in a second image frame, incrementing a count included in the first text metadata and associating the first text metadata with the second image frame; and initiating transmission of at least the first image frame, wherein initiating transmission of at least the first image frame includes initiating transmission of the first text metadata at the text metadata bit rate and initiating transmission of image data of the first image frame at the image data transmit bit rate.

11. The method of claim 10, wherein the text metadata comprises at least one font parameter and at least one text field parameter for the each identified text field, wherein the at least one font parameter is selected from a group comprising font size, font type, font color, font background color, font type qualifier, and text fill type, and wherein the at least one text field parameter is selected from a group comprising one or more position parameters for each identified text field, a content of the text itself for each identified text field, and a count of a number of text fields included in the image frame.

12. The method of claim 10, further comprising, responsive to a determination that no identified text field included in the first image frame is included in the second image frame, generating a second text metadata comprising metadata for each identified text field included in the second image frame and associating the second text metadata with the second image frame.

13. The method of claim 10, wherein the first text metadata comprises a start time and a stop time of a time interval that includes a plurality of sequential image frames that each includes at least one same text field.

14. The method of claim 10, further comprising identifying a first image transmit bit rate for the first image frame and generating a first image frame data having an image resolution related to the first image transmit bit rate.

15. A method comprising:

receiving text metadata transmitted at a text metadata bit rate and image frame data that is associated with the text metadata and transmitted at an image data transmit bit rate that is greater than the text metadata bit rate;

decoding, by a metadata reader logic, the received text metadata, the text metadata comprising metadata for one or more identified text fields included in an image frame of the received image frame data, and further comprising a count corresponding to a number of sequential image frames of the received image frame data that each include at least one of the one or more identified text fields; and rendering each of the one or more text fields based, at least in part, on the received text metadata.

16. The method of claim 15, wherein rendering each of the one or more text fields includes overlaying the rendered text field onto at least one image frame of the image frame data.

17. The method of claim 15, wherein the text metadata comprises at least one font parameter and at least one text field parameter for each of the one or more identified text fields, the at least one font parameter being selected from a group comprising font size, font type, font color, font background color, font type qualifier, and text fill type, and the at least one text field parameter being selected from a group comprising one or more position parameters for each of the one or more identified text fields, a content of a text itself for each of the one or more identified text fields, and a count of a number of text fields included in the image frame.

18. The method of claim 15, wherein the text metadata comprises a start time and a stop time of a time interval that includes a plurality of sequential image frames that each includes at least one same text field.

* * * * *